Jan. 2, 1951 S. BEHR 2,536,485
HAIR TRIMMER
Filed Jan. 6, 1949 2 Sheets-Sheet 1
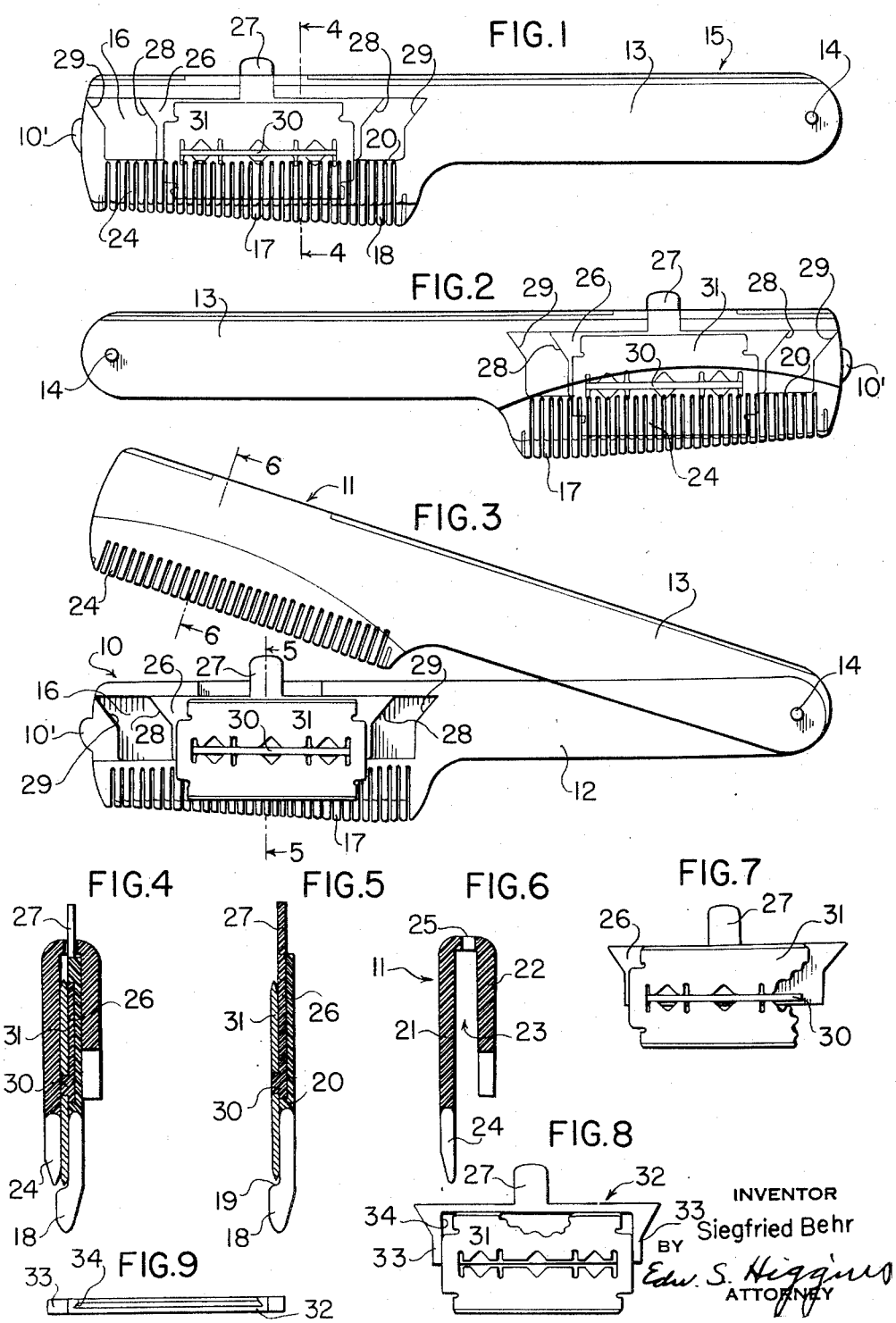
INVENTOR
Siegfried Behr
BY
Edw. S. Higgins
ATTORNEY Jan. 2, 1951 — S. BEHR — 2,536,485
HAIR TRIMMER
Filed Jan. 6, 1949 — 2 Sheets-Sheet 2
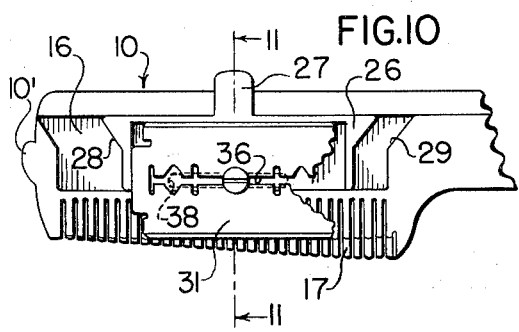
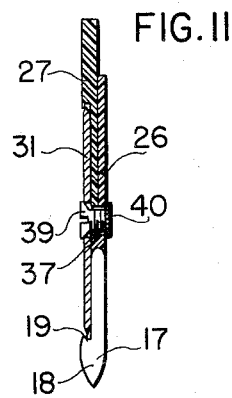
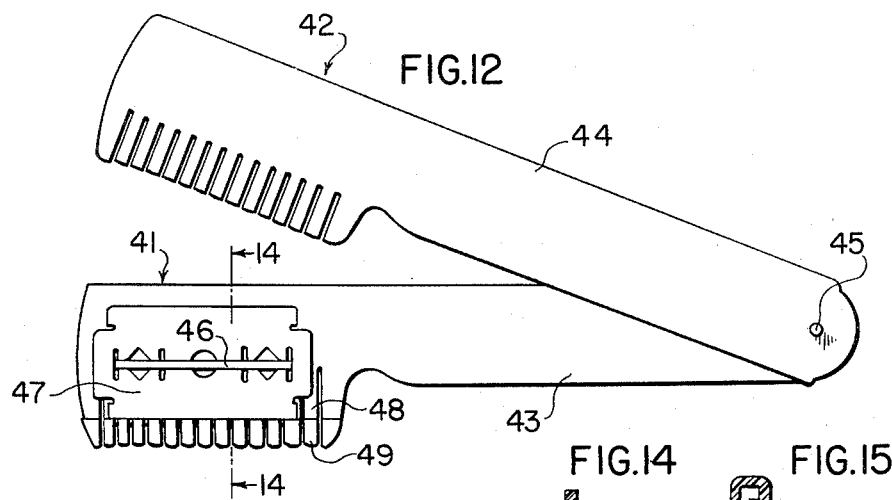
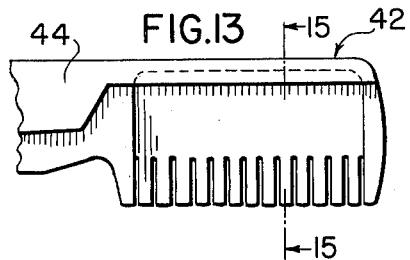
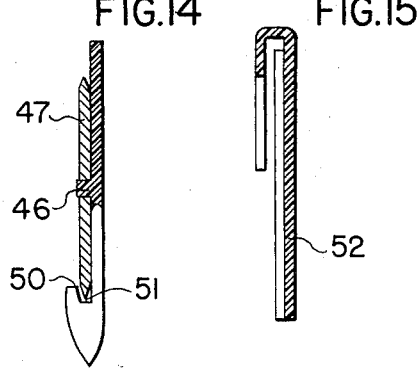
INVENTOR
Siegfried Behr
BY
Edw. S. Higgins
ATTORNEY Patented Jan. 2, 1951

2,536,485

UNITED STATES PATENT OFFICE 2,536,485

HAIR TRIMMER

Siegfried Behr, Flushing, N. Y., assignor to Ben-Hur Products, Inc., New York, N. Y., a corporation of New York Application January 6, 1949, Serial No. 69,520

5 Claims. (Cl. 30—30)

This invention relates particularly to hair trimmers.

A prime object of the present invention is to provide a device that is adapted to trim the hair efficiently and easily without requiring skill on the part of the user of the device.

Another object is to provide a hair trimmer with means for adjusting the size of the cut.

Another object is to provide a hair trimmer that is simple in construction, economical to manufacture, easily manipulated and attractive in appearance.

Another object is to provide such a hair trimmer with an elongated handle member whereby the trimmer may be readily grasped by the hand and increased pressure applied.

Another object is to provide a hair trimmer wherein the cutting element is completely covered when in operation thereby eliminating possibility of injury to the user.

Other objects and advantages of the invention will be apparent from the description thereof to follow taken in connection with the accompanying drawings in which—

Fig. 1 is a side view of a hair trimmer embodying one form of my invention.

Fig. 2 is a rear view thereof.

Fig. 3 is a side view showing the comb members in open position.

Fig. 4 is a sectional view on the plane of the line 4—4 of Fig. 1.

Fig. 5 is a sectional view on the plane of the line 5—5 of Fig. 3.

Fig. 6 is a sectional view on the plane of the line 6—6 of Fig. 3.

Fig. 7 is a front view of the razor blade holder, parts being broken away.

Fig. 8 is a front view of a modified form of razor blade holder, with parts being broken away.

Fig. 9 is a bottom plan view of the device of Fig. 8.

Fig. 10 is a fragmentary side view showing a modified form of hair trimmer.

Fig. 11 is a sectional view taken on the plane of the line 11—11 of Fig. 10.

Fig. 12 is a side view of a hair trimmer embodying still another modified form of the invention and showing the comb members in open position.

Fig. 13 is a fragmentary rear view of one of the comb members.

Fig. 14 is a sectional view taken on the plane of the line 14—14 of Fig. 12.

Fig. 15 is a sectional view taken on the plane of the line 15—15 of Fig. 13.

Referring to the drawings in detail, in the form of my invention shown in Figs. 1 to 7, inclusive, the improved hair trimmer includes comb members 10 and 11, each of which has an integral extension 12 and 13, respectively, pivoted together at 14. The extensions form a handle 15 as shown in Fig. 1. The comb members and extensions are preferably formed of suitable plastic material, which may be transparent, translucent or opaque and colored as desired. This form is shown as made of transparent plastic material.

The comb member 10 has a plate-like body including a back portion 16 and depending teeth 17 which are thickened or enlarged at their bottom pointed ends as indicated at 18 to form a shoulder 19. The bottom of the teeth 17 are arranged on a line at an angle to the line of the top edge of the back portion 16 whereby some of the teeth are longer than others. An elongated flange or shelf 20 is formed integrally on the inner face of the back portion 16 at the top of the toothed portion and extends substantially the length of said back portion.

The comb member 11 has a plate-like body including a back portion 21 having a bent-over portion 22 forming a U-shaped groove or slot 23. The bent over portion has an arcuate shaped bottom edge whereby the center of the back portion 21 is exposed. The teeth 24 depending from the back portion 21 have their bottom ends arranged on a line parallel with the top edge of the body portion. The top edge of the bent over portion 22 is formed with a central slot 25.

A thin plate member or blade holder 26 is positioned flat against the inner surface of the comb member 10 with its lower edge slidable on the upper edge of the shelf 20. An integral handle or finger piece 27 protrudes through the top edge of the comb member 10 for moving the plate member along the shelf. Each end of the plate member 26 is formed with an outwardly flaring portion 28 for engaging an outwardly flaring portion or stop 29 formed on the inner face of the comb member 10 at the end of the movement of the plate member in each direction. Adjacent the lower end of the plate member is an elongated rib or flange 30 for detachably supporting or holding a thin flexible safety razor blade 31. The plate member 26 and its supported razor blade are clamped in position by the comb member 11 when the latter is folded over the comb member 10 as shown in Fig. 1. When the comb member 11 is thus folded, its teeth 24 are adjacent the shoulder 19 of comb member 10 and are in alinement with the teeth of comb member 10. The plate member 26 and blade 31 may be moved along the comb members by means of the finger piece 27 so that the cutting edge of the blade is presented to the teeth of various lengths so that the size of the cut applied to the hair may be regulated and adjusted as desired.

An integral lug 10' may be provided on the free end of the comb members 10 to serve as a finger piece for facilitating separation of the comb members.

In Fig. 8 is shown a modified form of razor blade holder or supporting plate 32 for use with the comb members 10 and 11 of Fig. 1. This holder 32 has its side ends 33, 33 turned inwardly to provide grooves 34, 34 for frictionally receiving and gripping the side ends of the razor blade 31 whereby the blade is frictionally held against the surface of the holder.

In the modified form of hair trimmer shown in Figs. 10 and 11, means are provided for detachably fastening the razor blade holder or supporting plate 26 and razor blade 31 to the comb member 10. Such means comprises a screw, the shank of which passes through the slot 36 in the blade 31 and through a hole 37 formed in the blade holder or supporting plate 26 and through an elongated slot 38 formed in the comb member 10. The head 39 of the screw is slightly wider in diameter than the diameter of the slot 36 in the blade so that it is prevented from passing therethrough. A nut 40 on the free end of the shank of the screw prevents the shank from being pulled out through the slot 38 in the comb member 10.

The modified form of hair trimmer shown in Figs. 12 to 15 comprises comb members 41 and 42, each of which has an integral extension 43 and 44, respectively, pivoted together at 45. The extensions serve to form a handle for the device.

The comb member 41 has an integral shelf 46 on its inner face extending substantially its length for detachably mounting a razor blade 47. The comb member 42 when folded over the comb member 41 is adapted to clamp the razor blade in position as shown in Fig. 1.

The teeth 48 of the comb member 41 are thickened at their bottom ends as indicated at 49 to form a shoulder 50 which shoulder is provided with a groove 51 opening upwardly to receive the bottom edge of the razor blade 47 when positioned on the shelf 46. The bottom ends of the teeth 52 of the comb member 42 engage the shoulder 50 when said member 42 is folded over the comb member 41. The blade 47 of this form is not adjustable along the comb members as in the other forms of the invention.

I claim:

1. A hair trimmer comprising a pair of pivotally connected comb members, each comb member having a toothed portion, a plate member slidably and adjustably supported by one of said comb members for detachably supporting a safety razor blade thereon, the back portion of the other of said comb members being bent over forming a groove for receiving the back portion of the supporting comb member, said bent over portion being provided with a slot, said other comb member being adapted to be folded over the plate member and supporting comb member for clamping the holder with its blade in operative position and a finger piece on the plate member and protruding through the slot in said bent over portion for sliding said plate member with its blade along and between the comb members.

2. A hair trimmer as defined in claim 1 in which the bottom of the teeth of the comb member supporting the razor blade holder is at an angle to the upper edge of said comb member and the bottom of the teeth of the other foldable comb member is parallel with the upper edge of said latter comb member.

3. A hair trimmer of the kind described comprising a comb member having a toothed portion and an extension thereof, another comb member having a toothed portion and an extension thereof pivotally connected to the first-named extension, a flange formed along the inner face of said first-named comb member, a plate member slidably mounted on said flange, a flange formed along said plate member, a safety razor blade detachably mounted on said latter flange, said second-named comb member being adapted to be folded over said first-named comb member for clamping the plate member and blade on to said first-named comb member and between said comb members.

4. A hair trimmer as defined in claim 3 in which the bottom of the teeth of the first-named comb member is at an angle to the upper edge of said comb member and the bottom of the teeth of the other comb member is parallel with the upper edge of said latter comb member.

5. A hair trimmer of the kind described comprising a comb member having a toothed portion and an extension thereof, another comb member having a toothed portion and an extension thereof pivoted to the first-named extension, a flange formed along the inner face of said first-named comb member, a plate member slidably mounted on said flange, said plate member having inturned side end edges forming grooves along said end edges, a safety razor blade detachably mounted in said grooves, said second-named comb member being adapted to be folded over said first-named comb member and plate member for clamping the plate member and blade between said comb members.

SIEGFRIED BEHR.

REFERENCES CITED

The following references are of record in the file of this patent:

UNITED STATES PATENTS

| Number | Name | Date |
| --- | --- | --- |
| 1,227,548 | Carlisle | May 22, 1917 |
| 1,401,915 | Mainwaring | Dec. 27, 1921 |
| 2,141,340 | Baumgarten | Dec. 27, 1938 |

FOREIGN PATENTS

| Number | Country | Date |
| --- | --- | --- |
| 397,436 | Great Britain | Aug. 24, 1933 |
| 768,569 | France | May 22, 1934 |